3,060,754
EXTENSION SEAL
Karl A. Klingler, 111 S. Wright St., Naperville, Ill.
Filed Apr. 12, 1960, Ser. No. 21,699
4 Claims. (Cl. 74—18.2)

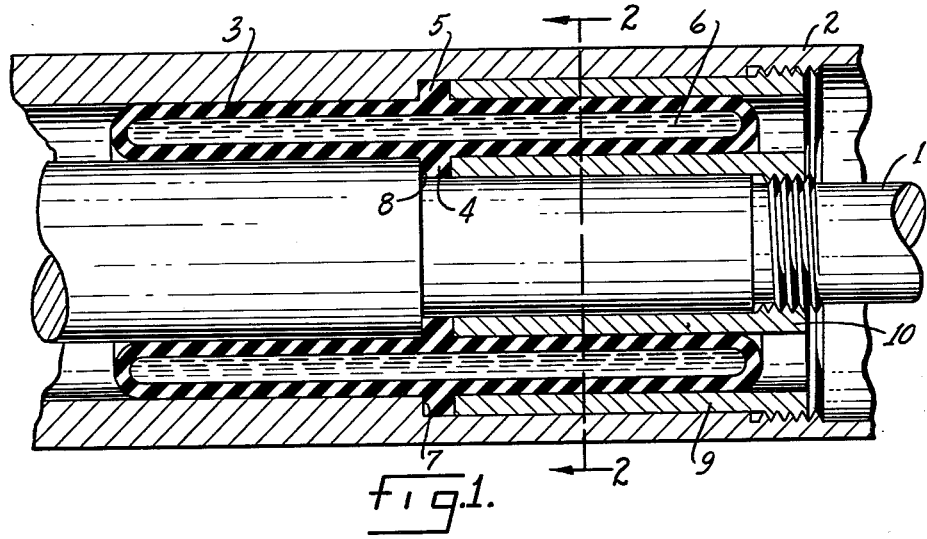
Fig. 1.
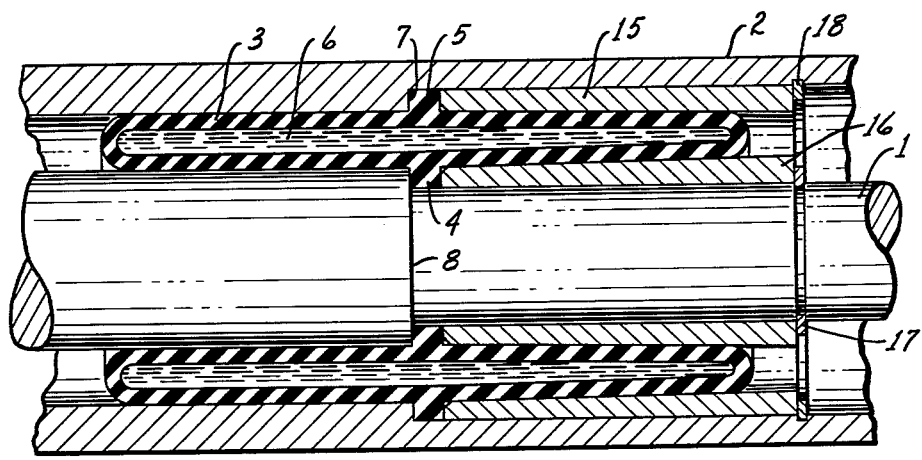
Fig. 3.
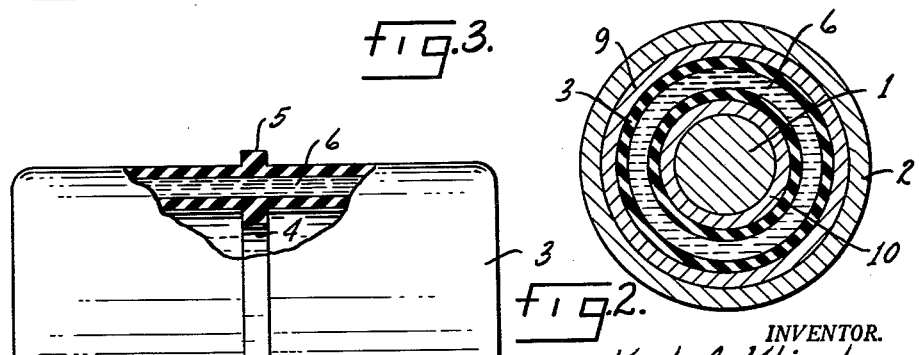
Fig. 4.
Fig. 2.
INVENTOR.
Karl A. Klingler,
BY Parker & Carter
Attorneys.

My invention relates to improvements in sealing means for reciprocating members and has for one object to provide a sealing or packing means for such a reciprocating member as a piston, a piston rod, a valve stem, or the like, where in the absence of complete destruction of the packing or sealing means, no leakage whatever can take place.

Another object of my invention is to provide packing or sealing means for such reciprocating objects wherein substantially the only friction or resistance to reciprocating movement is hydraulic friction.

Another object of my invention is to provide a packing or sealing means wherein resistance to relative movement of the sealed rod or member is independent of the pressure applied to the seal.

This invention is an improvement on the device of my United States Letters Patent No. 2,864,258 issued December 16, 1958 and has for its object to provide a seal which works on the same principle but which may be more easily and conveniently installed and will be more positive in its action.

Another object of my invention is to provide such a type of packing or sealing means as will require a minimum of accurately finished parts.

Other objects will appear from time to time throughout the specification and claims.

I have illustrated my invention as applied to a reciprocating part such as a valve stem but it will be quite obvious that it might equally well be applied to a multitude of other reciprocating members which may be subjected to pressure from either or both directions generally parallel to the line of reciprocation.

My invention is illustrated more or less diagrammatically in the accompanying drawings, wherein—

FIGURE 1 is a longitudinal section of my device;
FIGURE 2 is a section along the line 2—2 of FIGURE 1;
FIGURE 3 is a section similar to FIGURE 1 of a modified form;
FIGURE 4 is a side elevation in part section of the sealing element.

Like parts are indicated by like characters throughout the specification and drawings.

The plunger 1 is concentric with and reciprocates in the cylinder 2, the annular clearance between them is completely filled by the annular, elongated, elastomeric packing bag 3 which has intermediate its ends interior and exterior integral flanges 4 and 5. The bag is permanently sealed, completely filled before installation with a suitable hydraulic fluid 6. If high pressures are to be sealed, the bag may include fabric reinforcing and if desired, the fluid in the bag, before installation, may be in such volume as to be under greater or less initial pressure.

Intermediate their ends the plunger and the cylinder are exteriorly and interiorly shouldered at 7 and 8, the shoulders being perpendicular to their axes so that both are of two different diameters but uniformly cylindrical. In assembly, with the plunger in the cylinder the packing or sealing bag is placed on the small end of the plunger and slid into the large end of the cylinder until flanges 4 and 5 engage shoulders 8 and 7 respectively and snugly fill the narrower annular space between the cylinder and the plunger, being in firm contact with the surfaces thereof.

The filler sleeves 9 and 10 are slid respectively along the interior of the cylinder and the extension of the plunger to fill the clearances between the bag and the smaller diameter of the plunger and the larger diameter of the cylinder to engage the flanges 4 and 5 and force them against the shoulders 7 and 8, thus firmly seating the flanges and holding the bag in place. The filler sleeves fit snugly on the plunger and in the sleeve and the inner diameter of sleeve 9 is the same as the smaller diameter of the cylinder and the outer diameter of the sleeve 10 is the same as the larger diameter of the plunger. Thus the bag when assembled is enclosed in an annular pocket of uniform width from end to end.

The two sleeves are respectively interiorly and outwardly threaded at 11 and 12 to engage respectively outer and inner threads 13 and 14 on plunger and cylinder so that the filler or wedge, or packing sleeves are held in fixed position so that as the plunger reciprocates the bag ends roll back and forth between the plunger and the cylinder.

In the modified form shown in FIGURE 3, the sleeves 15 and 16 are slightly tapered where they contact the bag 3 for ease in assembly and if desired, the inner ends of the sleeves may be rounded or chamfered for ease of assembly. In this case the sleeves may be held in place by snap rings 17 and 18.

The inner ends of the sleeves are in effect shoulders in opposition to the shoulders on plunger and cylinder. The same effect of squeezing the flanges into fluid tight contact might be accomplished by splitting the cylinder as disclosed in Patent No. 2,864,258 above referred to and the same arrangement might be provided by splitting the plunger as shown therein.

The use and operation of my invention are as follows:
The important thing about this invention is that the seal bag may be prepared in advance and stocked on the shelf in a wide range of standard sizes, each bag being a separate, complete interchangeable unit, completely filled with the proper amount of hydraulic fluid and ready to be inserted between plunger and sleeve of predetermined, pre-known size. The bag being under little if any static pressure may easily be inserted in the space between the plunger and the cylinder. If two-part plunger and cylinder is used, the two parts may be brought together thereafter and coupled in any suitable way. As soon as pressure is applied to the bag from the outside, the seal goes into effect because the friction of the bag with respect to the opposed surfaces of the annulus prevents lateral displacement. The pressure applied to the outer and inner flanges gives a completely satisfactory fluid tight seal. The radial thickness of the mass of hydraulic fluid filling the bag is small in comparison to the thickness of the wall of the bag. It is only necessary that there be sufficient clearance between the opposed bag walls to permit free flow of the hydraulic fluid as the bag rolls back and forth in contact with the inner and outer surfaces of the annulus. The bag operates so far as its sealing is concerned the same way as the above mentioned earlier patent but in that patent it was necessary to assemble the bag parts in situ and thereafter to fill them with the hydraulic fluid. As a result, great expense occurred and there was an opportunity for mistake in assembly or in filling the bag. In this case, the bag is made to size, is filled and all that is necessary is to install it just as other seals are installed.

In the modified form, I have shown the wedging sleeves slightly tapered. This produces a slight change in the radial dimensions of the annular space where the sleeves are tapered but makes no difference whatever in the operation of the device. In each case the annular space is of generally the same radial dimension from end to end. The outer diameter of sleeve and plunger being substantially the same as the diameter of the plunger beyond the shoulder. The inner diameter of sleeve and plunger being substantially the same as the inner diameter beyond the shoulder. Unlike the usual seal where it is of the utmost importance that the rod be smooth and polished to avoid damage to or destruction of the sealing member, in this case roughness is desirable. The reciprocating members may have their opposed surfaces rough-turned without polishing. They may be actually corrugated or roughened because since the bag runs on and off and does not slide, such roughness is an advantage in that it holds the bag in place.

I claim:

1. In combination with a cylinder and a plunger mounted for reciprocation therein, a seal comprising an elastomeric permanently closed one-piece elongated annular bag completely filled with a hydraulic fluid and exteriorly and interiorly flanged intermediate its ends, means for permanently attaching the flanges in fluid tight connection respectively with the cylinder and the plunger the plunger extending under all conditions at both ends beyond the opposite ends of the bag whereby as one reciprocates with respect to the other, the bag rolls in, while completely filling, the clearance between the cylinder and plunger, said means including shoulders respectively on the outside of the plunger and the inside of the cylinder and wedge sleeves slidably along and forming a part of the plunger and cylinder adapted to hold the flanges against the shoulders.

2. In combination with a cylinder and a plunger mounted for reciprocation therein, a seal comprising an elastomeric permanently closed one-piece elongated annular bag completely filled with a hydraulic fluid and exteriorly and interiorly flanged intermediate its ends, means for permanently attaching the flanges in fluid tight connection respectively with the cylinder and the plunger the plunger extending under all conditions at both ends beyond the opposite ends of the bag whereby as one reciprocates with respect to the other, the bag rolls in, while completely filling, the clearance between the cylinder and plunger, said means including shoulders respectively on the outside of the plunger and the inside of the cylinder and wedge sleeves slidable along and forming a part of the plunger and cylinder adapted to hold the flanges against the shoulders, the sleeves being slightly tapered from their outer toward their inner ends.

3. In combination with a cylinder and a plunger mounted for reciprocation therein, a seal comprising an elastomeric permanently closed one-piece elongated annular bag completely filled with a hydraulic fluid and exteriorly and interiorly flange intermediate its ends, means for permanently attaching the flanges in fluid tight connection respectively with the cylinder and the plunger the plunger extending under all conditions at both ends beyond the opposite ends of the bag whereby as one reciprocates with respect to the other, the bag rolls in, while completely filling, the clearance between the cylinder and plunger, said means including shoulders respectively on the outside of the plunger and the inside of the cylinder and wedge sleeves slidable along and forming a part of the plunger and cylinder adapted to hold the flanges against the shoulders, the outer and inner diameters of the sleeves being substantially the same as the outer and inner diameters of cylinder and plunger on the side of the shoulder furthest from the sleeve.

4. In combination with a cylinder and a plunger mounted for reciprocation therein, a seal comprising an elastomeric permanently closed one-piece elongated annular bag completely filled with a hydraulic fluid and exteriorly and interiorly flanged intermediate its ends, means for permanently attaching the flanges in fluid tight connection respectively with the cylinder and the plunger the plunger extending under all conditions at both ends beyond the opposite ends of the bag whereby as one reciprocates with respect to the other, the bag rolls in, while completely filling, the clearance between the cylinder and plunger, said means including shoulders respectively on the outside of the plunger and the inside of the cylinder and wedge sleeves slidable along and forming a part of the plunger and cylinder adapted to hold the flanges against the shoulders, the sleeves being slightly tapered from their outer toward their inner ends, and means for locking the sleeves in position.

References Cited in the file of this patent

UNITED STATES PATENTS

| | | |
|---|---|---|
| 1,731,130 | Fulton | Oct. 8, 1929 |
| 2,264,656 | Briscoe et al. | Dec. 2, 1941 |
| 2,523,716 | Parr | Sept. 26, 1950 |
| 2,842,971 | Cornell | July 15, 1958 |

FOREIGN PATENTS

| | | |
|---|---|---|
| 456,103 | Germany | Feb. 16, 1928 |